(12) United States Patent
Yamada (10) Patent No.: US 9,729,095 B2
(45) Date of Patent: Aug. 8, 2017

(54) STEPPING MOTOR CONTROL CIRCUIT, SEMICONDUCTOR DEVICE, AND ANALOG ELECTRONIC TIMEPIECE

(71) Applicant: SEIKO EPSON CORPORATION, Tokyo (JP)

(72) Inventor: Osami Yamada, Nagano (JP)

(73) Assignee: Sieko Epson Corporation, Tokyo (JP)

( * ) Notice: Subject to any disclaimer, the term of this patent is extended or adjusted under 35 U.S.C. 154(b) by 126 days.

(21) Appl. No.: 14/735,432

(22) Filed: Jun. 10, 2015

(65) Prior Publication Data

US 2016/0033939 A1  Feb. 4, 2016

(30) Foreign Application Priority Data

Jul. 30, 2014 (JP) ................................ 2014-154611

(51) Int. Cl.
*G04C 3/14* (2006.01)
*H02P 8/06* (2006.01)
*H02P 8/02* (2006.01)

(52) U.S. Cl.
CPC ............. *H02P 8/06* (2013.01); *G04C 3/143* (2013.01); *H02P 8/02* (2013.01)

(58) Field of Classification Search
CPC .. G04G 9/00; G04C 3/00; G04C 3/143; H02P 8/06; H02P 8/02
See application file for complete search history.

(56) References Cited

U.S. PATENT DOCUMENTS

| 4,697,908 A | * | 10/1987 | Ogihara | G03B 7/10 |
| | | | | 396/244 |
| 5,933,392 A | * | 8/1999 | Sato | G04C 3/146 |
| | | | | 318/685 |
| 6,163,126 A | * | 12/2000 | Kojima | G04C 3/14 |
| | | | | 318/685 |

FOREIGN PATENT DOCUMENTS

JP 05-341059 A 12/1993
JP 2004-266078 A 9/2004

* cited by examiner

*Primary Examiner* — Sean Kayes
(74) *Attorney, Agent, or Firm* — Global IP Counselors, LLP (57) ABSTRACT

A stepping motor control circuit includes a drive pulse generation section that generates forward-rotation drive pulses that drive a stepping motor stepwise in a forward rotation direction and reverse-rotation drive pulses that drive the stepping motor stepwise in a reverse rotation direction and a forward/reverse rotation switching control section that switches the drive pulses outputted to the stepping motor from one of the forward-rotation drive pulses and the reverse-rotation drive pulses to the other, and the forward/reverse rotation switching control section switches the drive pulses outputted to the stepping motor from one of the forward-rotation drive pulses and the reverse-rotation drive pulses to the other and then provide a predetermined period before the other drive pulses are outputted to the stepping motor.

15 Claims, 5 Drawing Sheets

STEPPING MOTOR CONTROL CIRCUIT, SEMICONDUCTOR DEVICE, AND ANALOG ELECTRONIC TIMEPIECE

BACKGROUND

1. Technical Field

The present invention relates to a stepping motor control circuit, a semiconductor device including the stepping motor control circuit, and an analog electronic timepiece including the stepping motor control circuit.

2. Related Art

A chronograph timepiece has been used as an analog electronic timepiece having time hands for displaying the current time and chronograph hands for displaying a measured time length (a chronograph 1/10-second hand for display on a 1/10-second basis, a chronograph second hand for display on a 1-second basis, and a chronograph minute hand for display on a 1-minute basis).

A chronograph timepiece has a reset function for resetting each of the chronograph hands to return to the zero position after measurement is completed or in response to reset button operation. For example, JP-A-2004-2266078 introduces a chronograph timepiece having the following functions set therein and performed when the reset function is used: a function of forward rotation reset in which the chronograph hands are rotated in the forward direction (clockwise, for example) at the time of reset and reverse rotation reset in which the chronograph hands are rotated in the reverse direction (counterclockwise, for example) at the time of the reset.

The chronograph timepiece described in JP-A-2004-2266078 includes a stepping motor that is driven stepwise based on inputted drive pulses to move the chronograph hands (indicating hands) described above and a stepping motor control circuit that controls the stepping motor. The stepping motor control circuit includes a drive pulse generation section that generates forward-rotation drive pulses that drive the stepping motor stepwise in the forward direction and reverse-rotation drive pulses that drive the stepping motor stepwise in the reverse direction and a forward/reverse rotation switching control section that performs switching control in which the drive pulses outputted to the stepping motor are switched from one of the forward-rotation drive pulses and the reverse-rotation drive pulses to the other.

In the chronograph timepiece described in JP-A-2004-2266078, however, when the chronograph hands are reset, for example, by pressing a reset button, the chronograph hands can move in a reset rotation direction abnormally depending on the timing at which the reset button is pressed. That is, assuming that the stepping motor moves the chronograph hands in the forward rotation direction in normal operation whereas moving them in the reverse rotation direction at the time of reset, switching the normal-rotation drive pulses in the course of one cycle thereof to the reverse-rotation drive pulses, which drive the chronograph hands in the reset rotation direction, causes the timing at which the hands start being moved in the reverse rotation direction to be shifted, undesirably resulting in abnormal hand movement or what is called a hand movement error.

SUMMARY

An advantage of some aspects of the invention is to solve at least a part of the problems described above, and the invention can be implemented as the following forms or application examples.

Application Example 1

This application example is directed to a stepping motor control circuit that controls a stepping motor driven stepwise in a forward rotation direction or a reverse rotation direction based on inputted drive pulses and includes a drive pulse generation section that generates, as the drive pulses, forward-rotation drive pulses that drive the stepping motor stepwise in the forward rotation direction and reverse-rotation drive pulses that drive the stepping motor stepwise in the reverse rotation direction and a forward/reverse rotation switching control section that switches the drive pulses outputted to the stepping motor from one of the forward-rotation drive pulses and the reverse-rotation drive pulses to the other, and the forward/reverse rotation switching control section switches the drive pulses outputted to the stepping motor from one of the forward-rotation drive pulses and the reverse-rotation drive pulses to the other and then provide a predetermined period before the other drive pulses are outputted to the stepping motor.

According to this application example, at the time of forward/reverse rotation switching of the stepping motor, the forward/reverse rotation switching control section switches the drive pulses outputted to the stepping motor from one of the forward-rotation drive pulses and the reverse-rotation drive pulses to the other, provides the predetermined idle period, and then outputs the other drive pulses to the stepping motor. The control described above can prevent a problem of abnormal drive operation of the stepping motor based on the other drive pulses that occurs when the other drive pulses are outputted in the course of drive operation of the stepping motor based on the one of the two types of drive pulses.

Therefore, when the drive operation of the stepping motor is switched from one of the forward-rotation drive operation and the reverse-rotation drive operation to the other, the stepping motor control circuit provided in this application example can perform stable drive operation of the stepping motor in the rotating direction in the other drive operation as intended based on the other drive pulses.

Application Example 2

This application example is directed to the stepping motor control circuit according to the application example described above, wherein the predetermined period is an integer multiple of one cycle of the one of the forward-rotation drive pulses and the reverse-rotation drive pulses.

According to this application example, an idle period corresponding to one cycle of the one of the two types of drive pulses is at least provided, and the other drive pulses are then outputted to the stepping motor, whereby the drive operation of the stepping motor based on the other drive pulses after the forward/reverse rotation switching can be stably performed.

Application Example 3

This application example is directed to the stepping motor control circuit according to the application example described above, wherein the predetermined period is an integer multiple of the sum of one cycle of the one of the forward-rotation drive pulses and the reverse-rotation drive pulses and one cycle of the other drive pulses.

According to this application example, an idle period corresponding to the sum of one cycle of the one of the two types of drive pulses and one cycle of the other drive pulses before or after the forward/reverse rotation switching is at least provided, and the other drive pulses are then outputted to the stepping motor, whereby the drive operation of the stepping motor based on the other drive pulses after the forward/reverse rotation switching can be more stably performed.

Application Example 4

This application example is directed to the stepping motor control circuit according to the application example described above, wherein the predetermined period is produced in a masking process.

According to this application example, the masking process performed by the stepping motor control circuit, which provides the predetermined period, allows the drive operation of the stepping motor based on the other drive pulses after the forward/reverse rotation switching to be stabilized.

Application Example 5

This application example is directed to a semiconductor device including the stepping motor control circuit according to the application example described above.

According to this application example, since the drive operation of the stepping motor based on the other drive pulses after the forward/reverse rotation switching can be stabilized by using the single-chip semiconductor device, the size of an electronic apparatus or any other apparatus, which incorporates the stepping motor control circuit, can be reduced.

Application Example 6

This application example is directed to an analog electronic timepiece includes an indicating hand, a stepping motor that is driven stepwise based on inputted drive pulses to move the indicating hand in a forward rotation direction or a reverse rotation direction, and the stepping motor control circuit according to the application example described above or the semiconductor device according to the application example described above.

According to this application example, in which the stepping motor control circuit described in any of the application examples described above or the semiconductor device including the stepping motor control circuit is provided, when the rotating direction of the indicating hand is switched from one of the forward rotation direction and the reverse rotation direction to the other, the indicating hand can be stably moved in the other rotation direction after the switching.

Therefore, then analog electronic timepiece provided in this application example can switch the rotating direction of the indicating hand from one of the forward rotation direction and the reverse rotation direction to the other without a hand movement error.

Application Example 7

This application example is directed to the analog electronic timepiece according to the application example described above, which is a chronograph timepiece in which the indicating hand is formed of a plurality of indicating hands.

According to this application example, the chronograph timepiece provided in this application example can stably perform forward/reverse rotation switching of the plurality of indicating hands.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described below with reference to the drawings. In the following figures, each layer and each member are drawn at a scale different from an actual scale to be recognizably large.

Figure 1:
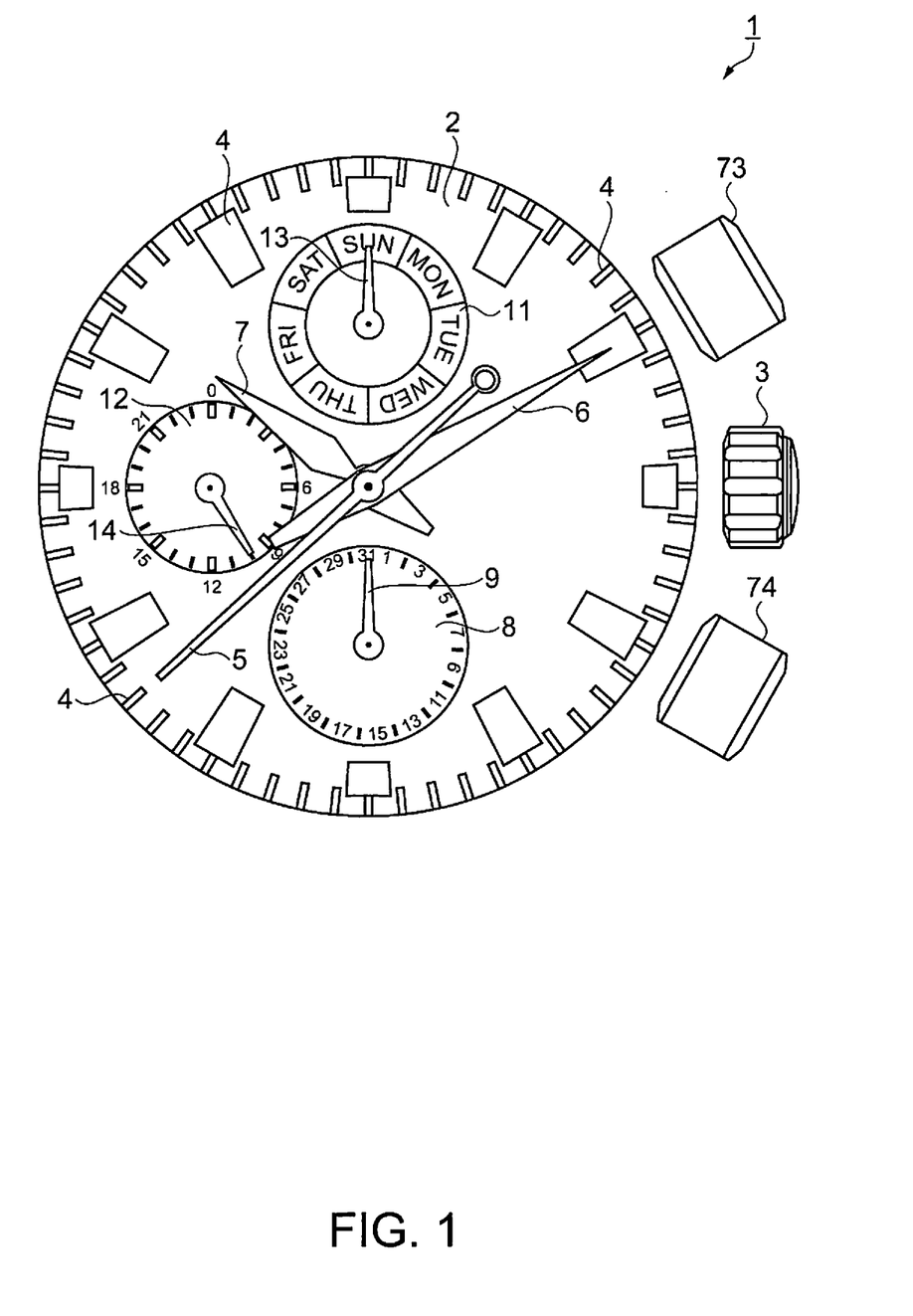
FIG. 1 is a plan view showing the form of display on a dial of a chronograph timepiece as an analog electronic timepiece according to an embodiment.

FIG. 1 is a plan view showing the form of display on a dial of a chronograph timepiece as an analog electronic timepiece according to the embodiment. A schematic configuration of a chronograph timepiece 1 according to the embodiment will first be described with reference to FIG. 1.

In FIG. 1, a dial 2 of the chronograph timepiece 1 is provided, along the circumferential edge thereof, with divisions 4 for time display. At the center of the dial 2 are coaxially disposed a second hand 5, a minute hand 6, and an hour hand 7, each of which displays time by indicating one of the divisions 4.

Assuming that the direction on the dial 2 along which a crown 3 is provided corresponds to a three-o'clock position, a day display section 8, which displays date, is provided in a six-o'clock position, and a day display hand 9 for a chronograph function is provided at the center of the day display section 8. Further, a 24-hour display section 12, which displays 24-hour time, is provided in a nine-o'clock position on the dial 2, and a 24-hour display hand 14 for a chronograph function is provided at the center of the 24-hour display section 12.

Still further, a day-of-week display section 11, which displays the day of a week, is provided in a twelve-o'clock position on the dial 2, and a day-of-week display hand 13 for a chronograph function is provided at the center of the day-of-week display section 11.

Examples of the chronograph timepiece 1 according to the present embodiment includes an analog electronic timepiece having a control circuit driven with energy from a primary battery and a stepping motor operating based on a pulse signal from the control circuit and a rechargeable analog timepiece having a secondary battery to which electric power generated by a power generator driven by rotation of a rotating weight or a solar cell is charged and a stepping motor operating based on a pulse signal from a control circuit driven with energy from the charged secondary battery. That is, the chronograph timepiece 1 may be driven based on any drive method. Since the configuration of an analog electronic timepiece is known, no detailed illustration or description thereof will be made herein.

The crown 3 is disposed in the three-o'clock position in the chronograph timepiece 1. Further, operation buttons 73 and 74, which are pressed to perform fast correction or to start or reset the chronograph hands, are disposed in positions in the vicinity of the crown 3. In the present embodiment, the two operation buttons 73 and 74 are disposed in a two-o'clock position and a four-o'clock position in the chronograph timepiece 1, respectively.

Figure 2:
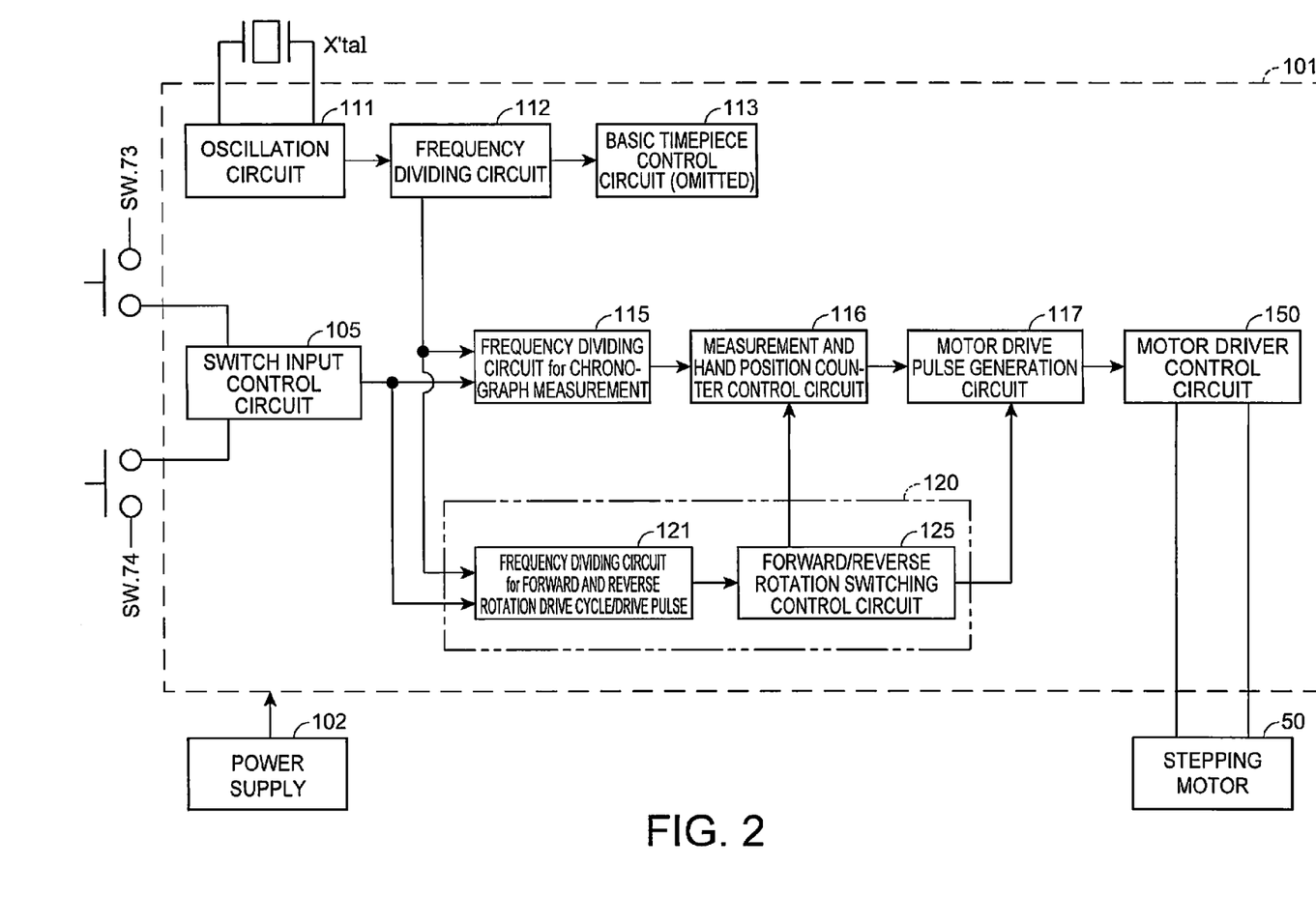
FIG. 2 is a block diagram showing a schematic configuration of a stepping motor control IC in the form of a semiconductor device including a stepping motor control circuit.

A description will next be made of a stepping motor control circuit that drives the indicating hands of the chronograph timepiece 1 described above to display time and perform each chronograph display. FIG. 2 is a block diagram showing a schematic configuration of a stepping motor control IC in the form of a semiconductor device including the stepping motor control circuit.

In FIG. 2, the stepping motor control circuit provided in the chronograph timepiece 1 described above is formed in a stepping motor control IC 101 in the form of a single-chip semiconductor device. The stepping motor control IC 101 includes an oscillation circuit 111, which produces a predetermined-frequency signal, a frequency dividing circuit 112, which divides the signal produced by the oscillation circuit 111 to produce a reference signal that serves as a reference for clocking, and a basic timepiece control circuit 113, which controls each electronic circuit element that provides a basic timepiece function of the chronograph timepiece 1, changes drive pulses, and performs other types of control.

The stepping motor control IC 101 further includes a frequency dividing circuit for chronograph measurement 115, which divides the signal produced by the frequency dividing circuit 112 to produce a signal for chronograph measurement, and a measurement and hand position counter control circuit 116, which performs the chronograph measurement using each of the chronograph hands and measures and controls the position of the chronograph hand in each of the chronograph display sections.

The stepping motor control IC 101 further includes a forward/reverse rotation switching control section 120, which performs switching control in which drive pulses outputted to a stepping motor 50 are switched from one of forward-rotation drive pulses and reverse-rotation drive pulses to the other. The forward/reverse rotation switching control section 120 includes a frequency dividing circuit for forward and reverse rotation drive cycles/drive pulses 121, which divides the signal produced by the frequency dividing circuit 112 to produce a forward-rotation drive cycle and a reverse-rotation drive cycle and outputs the forward-rotation drive pulses and the reverse-rotation drive pulses, and a forward/reverse rotation switching control circuit 125, which performs switching control in which the signal (drive pulses) outputted to the stepping motor 50 is switched from one to the other. A detailed circuit configuration of the forward/reverse rotation switching control section 120 will be described later.

A switch input control circuit 105 is connected to the frequency dividing circuit for chronograph measurement 115 and the frequency dividing circuit for forward and reverse rotation drive cycles/drive pulses 121. The operation buttons 73 and 74 are connected to the switch input control circuit 105, and a user can perform normal operation on the operation button 73 or 74 to cause, via the switch input control circuit 105, the frequency dividing circuit for chronograph measurement 115 and the measurement and hand position counter control circuit 116 to operate each of the chronograph display sections and cause the frequency dividing circuit for forward and reverse rotation drive cycles/drive pulses 121 and the forward/reverse rotation switching control circuit 125 to perform the forward/reverse rotation switching operation.

The stepping motor control IC 101 further includes a motor drive pulse generation circuit 117, which generates motor drive pulses outputted to the stepping motor 50 based on information outputted from the measurement and hand position counter control circuit 116 and information outputted from the forward/reverse rotation switching control circuit 125, and a motor driver control circuit 150, which drives and controls the stepping motor 50 based on the motor drive pulses generated by the motor drive pulse generation circuit 117. The thus configured stepping motor control IC 101 can cause the stepping motor 50, which is connected to the motor driver control circuit 150, to allow the chronograph timepiece 1 (see FIG. 1) to display time and each of the chronograph display sections to perform desired display and operation.

A power supply 102, such as the secondary battery described above, which supplies the stepping motor control IC 101, the stepping motor 50, and other circuit elements with drive electric power, is connected to the stepping motor control IC 101 described above.

Figure 3:
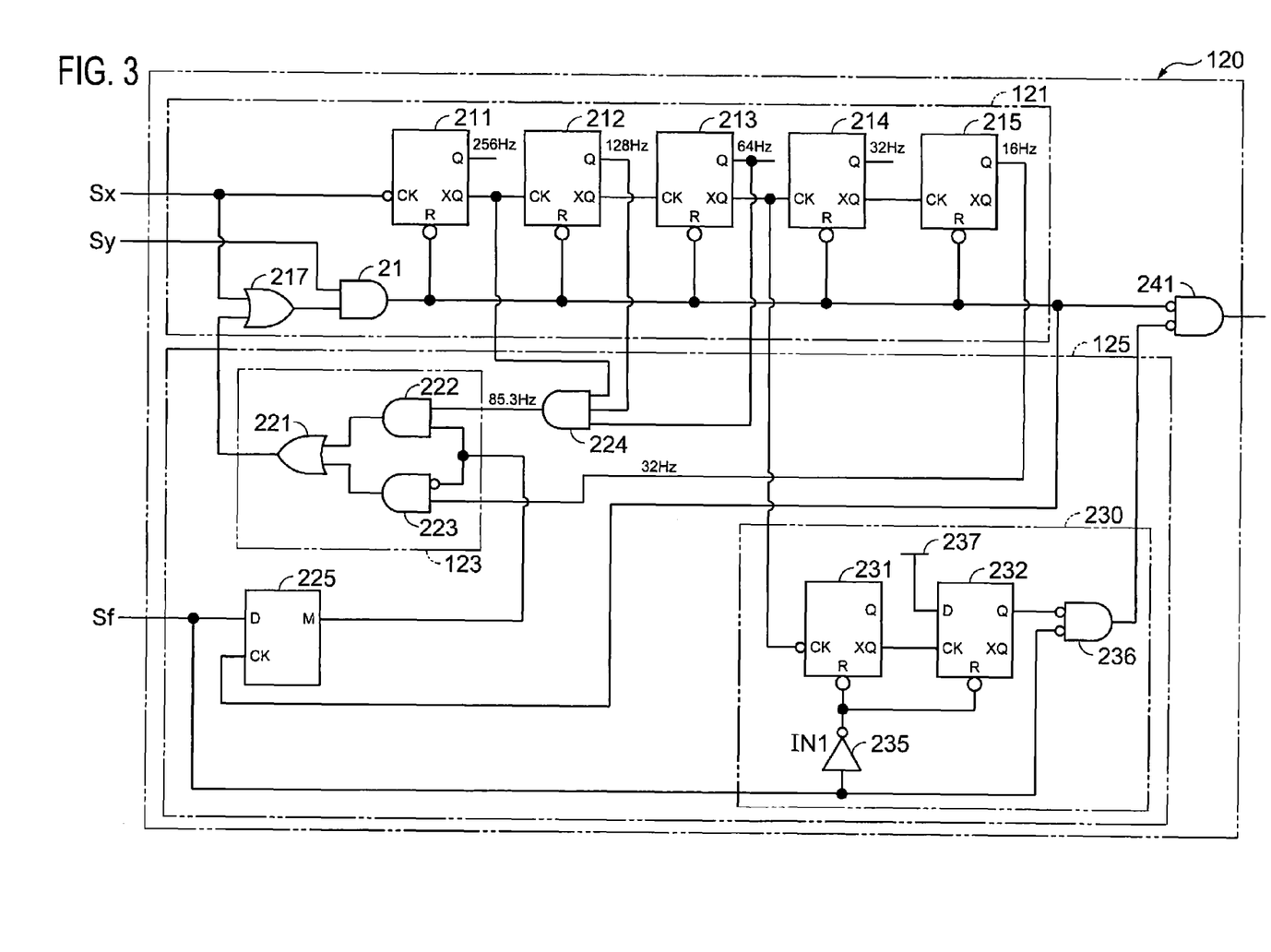
FIG. 3 is a circuit diagram for describing a detailed configuration of a forward/reverse rotation switching control section indicated by the chain double-dashed line in FIG. 2.

The forward/reverse rotation switching control section 120, which is provided in the stepping motor control IC 101 described above, will now be described in detail with reference to the drawings. FIG. 3 is a circuit diagram for describing a detailed configuration of the forward/reverse rotation switching control section 120, which is indicated by the chain double-dashed line in FIG. 2.

In FIG. 3, the forward/reverse rotation switching control section 120 includes the frequency dividing circuit for forward and reverse rotation drive cycles/drive pulses 121 and the forward/reverse rotation switching control circuit 125 described above, and the forward/reverse rotation switching control circuit 125 includes a selector control circuit 123 and a mask control circuit 230.

The frequency dividing circuit for forward and reverse rotation drive cycles/drive pulses 121 has a plurality of cascaded flip-flops 211 to 215. In the present embodiment, the five flip-flops, from the forefront flip-flop 211 to the downstream flip-flop 212, flip-flop 213, flip-flop 214, and flip-flop 215, are connected to each other to form a 5-bit counter circuit.

A 512-Hz reference signal Sx inputted from the frequency dividing circuit 112 (see FIG. 2) is inputted to a clock input CK of the first flip-flop 211, and a signal from the input CK is outputted at the trailing edge timing of the input pulse to a Q terminal (Q output), where the signal is held. An XQ output is always an inverted output that is an inverted Q output and is inputted to the clock input CK of the downstream flip-flop 212. Similarly, the XQ output from the flip-flop 212 that is an inversion of the Q output thereof is inputted to the downstream flip-flop 213, and the XQ output from the flip-flop 213 is further inputted to and outputted from the downstream flip-flops 214 and 215. The flip-flops 211 to 215 are thus connected to each other. A frequency dividing circuit (counter circuit) formed of the thus connected flip-flops divides the inputted 512-Hz reference signal Sx to produce a drive cycle for the forward-rotation drive operation and a drive cycle for the reverse-rotation drive operation. That is, to produce a cycle of 85.3 Hz for the forward-rotation drive operation, the 512-Hz cycle of the reference signal Sx is counted six times, whereas to produce a cycle of 32 Hz for the reverse-rotation drive operation, the 512-Hz cycle of the reference signal Sx is counted sixteen times.

The forward-rotation drive cycle/drive pulses (85.3 Hz) and the reverse-rotation drive cycle/drive pulses (32 Hz), which have been produced by the frequency dividing circuit for forward and reverse rotation drive cycles/drive pulses 121, which divides the reference signal Sx, are outputted to the selector control circuit 123 in the forward/reverse rotation switching control circuit 125. The selector control circuit 123 includes an AND gate 222, an AND gate 223, and an OR gate 221, to which the AND gate 222 and the AND gate 223 are connected.

The XQ output from the first flip-flop 211, the Q output from the second flip-flop 212, and the Q output from the third flip-flop 213 in the frequency dividing circuit for forward and reverse rotation drive cycles/drive pulses 121 are outputted to an AND gate 224, and the 85.3-Hz forward-rotation drive cycle/drive pulses outputted from the AND gate 224 are inputted to the AND gate 222 in the selector control circuit 123.

Further, the 32-Hz reverse-rotation drive cycle/drive pulses, which are the Q output from the fifth flip-flop 215 in the frequency dividing circuit for forward and reverse rotation drive cycles/drive pulses 121, are inputted to the AND gate 223 in the selector control circuit 123.

A forward/reverse rotation switching flag Sf, which is outputted from the switch input control circuit 105 (see FIG. 2), is inputted to the AND gate 222 and the AND gate 223 in the selector control circuit 123. The forward/reverse rotation switching flag Sf represents switching from the forward-rotation drive operation or the reverse-rotation drive operation selected by user's operation of the operation button 73 or 74 to the other, and the switch input control circuit 105 inputs the result of the switching operation in the form of the forward/reverse rotation switching flag signal Sf to a data input D of a latch 225. A latched output M is then outputted to the selector control circuit 123. Based on the forward/reverse rotation switching flag Sf, one of the forward-rotation drive cycle/drive pulses (85.3 Hz) inputted to the AND gate 222 and the reverse-rotation drive cycle/drive pulses (32 Hz) inputted to the AND gate 223 is outputted from the OR gate 221 to an OR gate 217 in the frequency dividing circuit for forward and reverse rotation drive cycles/drive pulses 121. The 512-Hz reference signal Sx is also inputted to the OR gate 217, and an output from the OR gate 217 is inputted to an AND gate 21. An initializing signal Sy is also inputted to the AND gate 21, and an output from the AND gate 21 is inputted to a reset terminal R of each of the flip-flops 211 to 215 and a clock input CK of the latch 225 in the forward/reverse rotation switching control circuit 125 and is connected to and terminated at a NOR gate 241.

The mask control circuit 230 has a flip-flop 231, a latch 232, and a NOR gate 236. The XQ output from the third flip-flop 213 in the frequency dividing circuit for forward and reverse rotation drive cycles/drive pulses 121 is inputted to the clock input CK of the flip-flop 231, and the XQ output from the flip-flop 231 is outputted to the clock input CK of the latch 232. A pull-up resistor 237 is connected to the data input D of the latch 232. A Q output of the latch 232 is outputted to the NOR gate 236, and an output from the NOR gate 236 is inputted to the NOR gate 241.

The forward/reverse rotation switching flag Sf is inputted to the NOR gate 236. The forward/reverse rotation switching flag Sf is also inputted to reset terminals R of the flip-flop 231 and the latch 232 via a NOT gate and connected to and terminated at the NOR gate 236.

A motor drive pulse output control signal that is the output from the NOR gate 241, to which the signals from the two routes described above are inputted, is outputted to the measurement and hand position counter control circuit 116 and the motor drive pulse generation circuit 117 shown in FIG. 2.

Figure 4A:
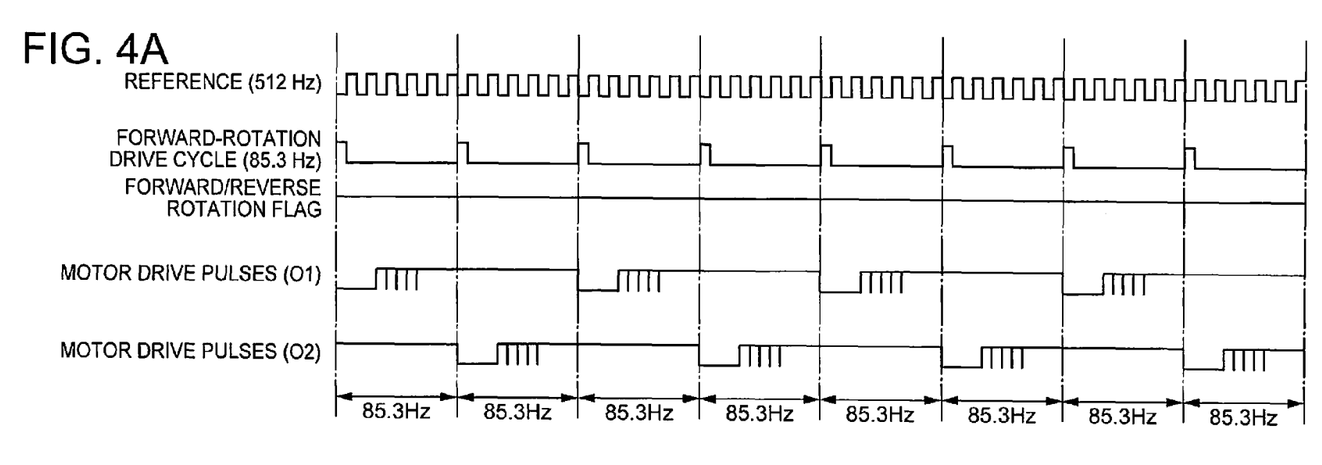
FIG. 4A is a timing chart showing a forward-rotation drive action of the stepping motor control circuit in the embodiment.
Figure 4B:
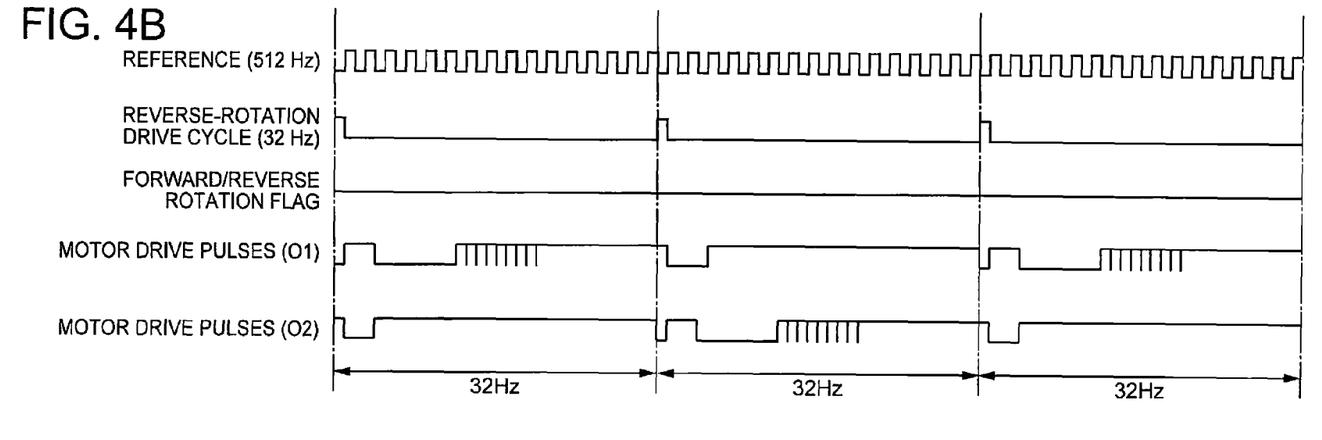
FIG. 4B is a timing chart showing a reverse-rotation drive action of the stepping motor control circuit.
Figure 5:
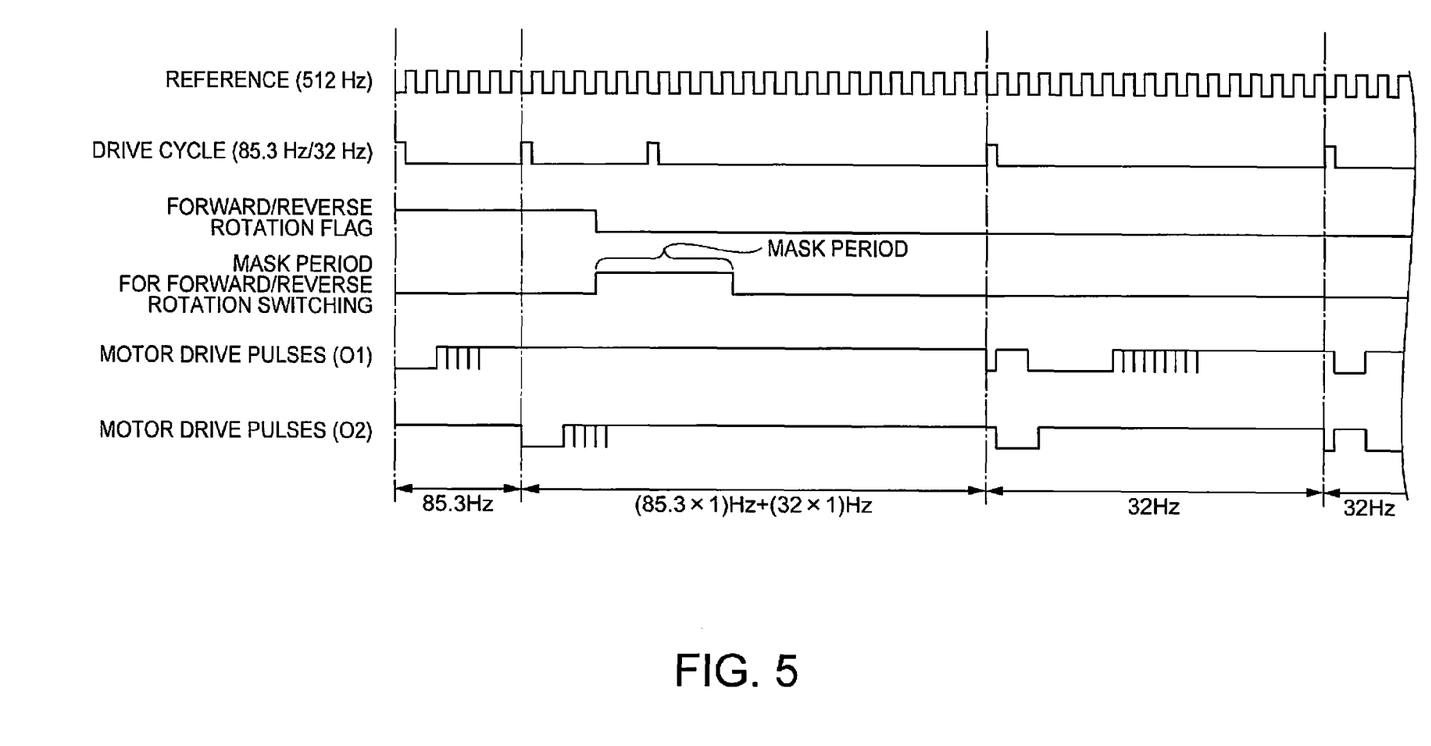
FIG. 5 is a timing chart showing the action of the stepping motor control circuit in the embodiment at the time of forward/reverse rotation switching.

A description will next be made of the action of stepping motor control performed by the stepping motor control IC including the forward/reverse rotation switching control section 120 described above in the present embodiment. FIGS. 4A and 4B show the action of the stepping motor control IC. FIG. 4A is a timing chart showing the action in the forward-rotation drive operation, and FIG. 4B is a timing chart showing the action in the reverse-rotation drive operation. FIG. 5 is a timing chart showing the action of the stepping motor control IC 101 in the embodiment when it performs the forward/reverse rotation switching.

As shown in FIG. 4A, the 85.3-Hz forward-rotation drive cycle is produced by dividing the 512-Hz reference signal by six, and motor drive pulses O1 and O2 for the forward-rotation drive operation, which are synchronized with the 85.3-Hz forward-rotation drive cycle, are outputted.

The forward/reverse rotation flag is "High" representing the forward rotation.

As shown in FIG. 4B, the 32-Hz reverse-rotation drive cycle is produced by dividing the 512-Hz reference signal by sixteen, and motor drive pulses O1 and O2 for the reverse-rotation drive operation, which are synchronized with the 32-Hz reverse-rotation drive cycle, are outputted.

The forward/reverse rotation flag is "Low" representing the reverse rotation.

When the 85.3-Hz forward-rotation drive cycle and the motor drive pulses associated therewith shown in FIG. 4A are switched to the 32-Hz reverse-rotation drive cycle and the motor drive pulses associated therewith shown in FIG. 4B, that is, when the forward/reverse rotation flag is switched from "High" to "Low," the flag is most likely to be switched in the course of one cycle of the stepping motor drive operation based on the 85.3-Hz forward-rotation drive cycle. When the forward-rotation drive pulses are thus switched in the course of one cycle thereof to the reverse-rotation drive pulses, the timing at which the reverse-rotation hand movement starts is undesirably shifted. In this case, in the chronograph timepiece 1 (see FIG. 1), when the chronograph display sections and other sections are reset, the timing at which hand movement in the reverse rotation direction, which is the direction at the time of reset, starts is undesirably shifted, possibly resulting in abnormal hand movement or what is called a hand movement error.

The stepping motor control IC 101 in the present embodiment, in which the forward/reverse rotation switching control section 120 includes the mask control circuit 230, can prevent the hand movement error in the hand movement reset operation at the time of the forward/reverse rotation switching.

FIG. 5 shows a state in which after the stepping motor is driven for one cycle of the forward-rotation drive cycle (85.3 Hz) as the drive cycle (85.3 Hz/32 Hz), the forward/reverse rotation flag is switched from "High" to "Low" in the course of the following second cycle to perform forward rotation/reverse rotation switching or switch to the reverse-rotation drive cycle (32 Hz). In the present embodiment, the mask control circuit 230 described above performs masking on the forward/reverse rotation switching control section 120 at the timing when the forward/reverse rotation flag is switched from "High" to "Low" to provide a predetermined period after the forward-rotation drive cycle (85.3 Hz) immediately before the forward/reverse rotation flag is switched from "High" to "Low" is completed but before the reverse-rotation drive cycle "32 Hz" immediately after the forward/reverse rotation flag is switched to "Low." The predetermined period can be an integer multiple of the sum of the forward-rotation drive cycle (85.3 Hz) and the reverse-rotation drive cycle (32 Hz). In the present embodiment, the predetermined period is set to be an integer multiple of the sum of the forward-rotation drive cycle (85.3 Hz) and the reverse-rotation drive cycle (32 Hz) ((85.3 Hz+32 Hz) times one).

As described above, the stepping motor control IC 101 and the chronograph timepiece 1 including the same according to the present embodiment can provide the following advantageous effects.

For example, according to the embodiment described above, at the time of forward/reverse rotation switching of the stepping motor 50, the forward/reverse rotation switching control section 120 switches the drive pulses outputted to the stepping motor 50 from the forward-rotation drive pulses to the reverse-rotation drive pulses, provides the predetermined idle period, and then outputs the reverse-rotation drive pulses to the stepping motor 50. The control described above can prevent a problem of abnormal drive operation of the stepping motor 50 based on the reverse-rotation drive pulses that occurs when the reverse-rotation drive pulses are outputted in the course of drive operation of the stepping motor 50 based on the forward-rotation drive pulses.

The stepping motor control circuit (stepping motor control IC 101) and the chronograph timepiece 1 including the same provided in the present embodiment can perform stable reverse-rotation hand movement (reset hand movement) as intended based on the reverse-rotation drive pulses without a hand movement error at the time of forward/reverse rotation switching.

Further, in the embodiment described above, when the drive pulses outputted to the stepping motor 50 are switched from the forward-rotation drive pulses to the reverse-rotation drive pulses, the predetermined idle period provided before the reverse-rotation drive pulses are outputted to the stepping motor 50 is set to be an integer multiple (1× in the embodiment described above) of the sum of the forward-rotation drive cycle (85.3 Hz) and the reverse-rotation drive cycle (32 Hz).

As a result, an idle period corresponding to the sum of one cycle of the forward-rotation drive pulses (85.3 Hz) and one cycle of the reverse-rotation drive pulses (32 Hz) is at least provided before the forward/reverse rotation switching, the reverse-rotation drive pulses are outputted to the stepping motor 50 to initiate the reverse rotation drive operation, whereby the drive operation of the stepping motor 50 based on the reverse-rotation drive pulses after the forward/reverse rotation switching can be performed more stably.

Further, in the embodiment described above, in the stepping motor control circuit (stepping motor control IC 101), after the drive pulses outputted to the stepping motor 50 are switched from the forward-rotation drive pulses to the reverse-rotation drive pulses, the predetermined idle period provided before the reverse-rotation drive pulses are outputted to the stepping motor 50 is produced by masking performed by the mask control circuit 230.

According to the configuration described above, the masking performed by the mask control circuit 230 in the stepping motor control IC 101 allows the drive operation of the stepping motor 50 based on the reverse-rotation drive pulses after the forward/reverse rotation switching to be readily stabilized.

Further, in the embodiment described above, the stepping motor control circuit including the mask control circuit 230 is formed in the stepping motor control IC 101 in the form of a single-chip semiconductor device.

According to the configuration described above, since the drive operation of the stepping motor 50 based on the reverse-rotation drive pulses after the forward/reverse rotation switching can be stabilized by using the single-chip semiconductor device, the size of the chronograph timepiece 1, which incorporates the stepping motor control circuit, can be reduced.

The embodiment of the invention made by the inventor has been specifically described. The invention is not limited to the embodiment described above, and a variety of changes can be made thereto to the extent that they do not depart from the substance of the invention.

For example, in the embodiment described above, after the forward-rotation drive cycle immediately before the forward/reverse rotation flag is switched from "High" to "Low" is completed, the predetermined period provided before the output operation of the reverse-rotation drive pulses to the stepping motor 50 immediately after the forward/reverse rotation flag is switched to "Low" is initiated is set to be an integer multiple of the sum of the forward-rotation drive cycle (85.3 Hz) and the reverse-rotation drive cycle (32 Hz).

The configuration described above is not necessarily employed. For example, when the forward-rotation drive operation is switched to the reverse-rotation drive operation, the predetermined period may be set to be an integer multiple of the forward-rotation drive cycle, and when the reverse-rotation drive operation is switched to the forward-rotation drive operation, the predetermined period may be set to be an integer multiple of the reverse-rotation drive cycle.

In this case, when one of the forward-rotation drive pulses and the reverse-rotation drive pulses is switched to the other, an idle period corresponding to at least one cycle of the one of the forward-rotation drive pulses and the reverse-rotation drive pulses is provided, and the other drive pulses are outputted to the stepping motor 50, whereby the drive operation of the stepping motor based on the other drive pulses after the forward/reverse rotation switching can be stabilized and the predetermined period can be shorter than in the embodiment described above for improvement in efficiency.

Further, in the embodiment described above, the mask control circuit 230 described above performs masking on the forward/reverse rotation switching control section 120 to prevent problems, such as a hand movement error at the time of the forward/reverse rotation switching. The mask control circuit 230 is, however, not necessarily used, and the reverse-rotation pulse idle period after the forward/reverse rotation switching may be provided in another way. For example, a timing adjustment circuit may be formed in the stepping motor control circuit. In this case, the timing adjustment circuit may provide an idle period corresponding to an integer multiple of the forward-rotation drive cycle or an integer multiple of the sum of the forward-rotation drive cycle and the reverse-rotation drive cycle after the forward/reverse rotation switching and then output the reverse-rotation drive pulses to the stepping motor 50.

Further, the chronograph timepiece 1 in the embodiment described above has been described with reference to the configuration in which the day display section 8, the 24-hour display section 12, and the day-of-week display section 11 are provided as the display sections for the chronograph function. The display sections described above are not necessarily employed, and the basic configuration in the embodiment described above is also applicable to a chronograph that displays other types of information and a chronograph that repeats reverse-rotation hand movement immediately after forward-rotation hand movement or what is called a chronograph that performs retrograde hand movement.

Further, the basic configuration in the embodiment described above is also applicable to an analog electronic timepiece, such as an analog electronic timepiece that performs only time display, as well as the chronograph timepiece 1.

Further, the above embodiment has been described with reference to the case where the forward-rotation drive operation is switched to the reverse-rotation drive operation, and the basic configuration according to the embodiment of the invention is also applicable to a stepping motor control circuit that adjusts, when one of the forward-rotation drive operation and the reverse-rotation drive operation is switched to the other, the period provided before the other drive pulses start being outputted to the stepping motor 50, and to an analog electronic timepiece including the stepping motor control circuit.

The entire disclosure of Japanese Patent Application No. 2014-154611, filed Jul. 30, 2014 is expressly incorporated by reference herein.

What is claimed is:

1. A stepping motor control circuit that controls a stepping motor driven stepwise in a forward rotation direction or a reverse rotation direction based on a drive pulse, the control circuit comprising:
   a drive pulse generation section that generates, as the drive pulse, a forward-rotation drive pulse that drives the stepping motor stepwise in the forward rotation direction and a reverse-rotation drive pulse that drives the stepping motor stepwise in the reverse rotation direction; and
   a forward/reverse rotation switching control section that switches the drive pulse outputted to the stepping motor from one of the forward-rotation drive pulse and the reverse-rotation drive pulse to the other one of the forward-rotation drive pulse and the reverse-rotation drive pulse in response to a control input to reverse a rotation direction of the stepping motor, and
   outputs the other one of the forward-rotation drive pulse and the reverse-rotation drive pulse to the stepping motor subsequent to the control input after a predetermined period has elapsed from the one of the forward-rotation drive pulse and the reverse-rotation drive pulse is outputted to the stepping motor prior to the control input.

2. The stepping motor control circuit according to claim 1,
   wherein the predetermined period is an integer multiple of one cycle of the one of the forward-rotation drive pulse and the reverse-rotation drive pulse.

3. A semiconductor device comprising the stepping motor control circuit according to claim 2.

4. An analog electronic timepiece comprising:
   an indicating hand;
   a stepping motor that is driven stepwise based on inputted drive pulses to move the indicating hand in a forward rotation direction or a reverse rotation direction; and
   the stepping motor control circuit according to claim 2.

5. The stepping motor control circuit according to claim 1,
   wherein the predetermined period is an integer multiple of the sum of one cycle of the one of the forward-rotation drive pulse and the reverse-rotation drive pulse and one cycle of the other one of the forward-rotation drive pulse and the reverse-rotation drive pulse.

6. A semiconductor device comprising the stepping motor control circuit according to claim 5.

7. An analog electronic timepiece comprising:
   an indicating hand;
   a stepping motor that is driven stepwise based on inputted drive pulses to move the indicating hand in a forward rotation direction or a reverse rotation direction; and
   the stepping motor control circuit according to claim 5.

8. The stepping motor control circuit according to claim 1,
   wherein the predetermined period is produced in a masking process.

9. A semiconductor device comprising the stepping motor control circuit according to claim 8.

10. An analog electronic timepiece comprising:
    an indicating hand;
    a stepping motor that is driven stepwise based on inputted drive pulses to move the indicating hand in a forward rotation direction or a reverse rotation direction; and
    the stepping motor control circuit according to claim 8.

11. A semiconductor device comprising the stepping motor control circuit according to claim 1.

12. An analog electronic timepiece comprising:
    an indicating hand;
    a stepping motor that is driven stepwise based on inputted drive pulses to move the indicating hand in a forward rotation direction or a reverse rotation direction; and
    the semiconductor device according to claim 11.

13. An analog electronic timepiece comprising:
    an indicating hand;
    a stepping motor that is driven stepwise based on inputted drive pulses to move the indicating hand in a forward rotation direction or a reverse rotation direction; and
    the stepping motor control circuit according to claim 1.

14. The analog electronic timepiece according to claim 13,
    wherein the analog electronic timepiece is a chronograph timepiece in which the indicating hand is formed of a plurality of indicating hands.

15. The stepping motor control circuit according to claim 1,
    wherein the control input is inputted manually by a user.

* * * * *